United States Patent [19]
Mo et al.

[11] Patent Number: 5,935,074
[45] Date of Patent: Aug. 10, 1999

[54] METHOD AND APPARATUS FOR AUTOMATIC TRACING OF DOPPLER TIME-VELOCITY WAVEFORM ENVELOPE

[75] Inventors: Larry Y. L. Mo, Waukesha; David D. Becker, Milwaukee, both of Wis.; Kevin McCann, Raleigh, N.C.; Masayoshi Honda; Shinichi Ishiguro, both of Tokyo, Japan

[73] Assignee: General Electric Company, Milwaukee, Wis.

[21] Appl. No.: 08/944,119

[22] Filed: Oct. 6, 1997

[51] Int. Cl.⁶ ........................................................ A61B 8/00
[52] U.S. Cl. ............................................ 600/454; 600/455
[58] Field of Search .................................... 600/443, 447, 600/454, 455; 128/916

[56] References Cited

U.S. PATENT DOCUMENTS

| | | | |
|---|---|---|---|
| 4,217,909 | 8/1980 | Papadofrangakis | 128/663 |
| 4,257,278 | 3/1981 | Papadofrangakis | 73/861.25 |
| 4,265,126 | 5/1981 | Papadofrangakis | 73/861.25 |
| 5,287,753 | 2/1994 | Routh et al. | 73/861.25 |
| 5,291,892 | 3/1994 | O'Donnell | 600/455 |
| 5,419,331 | 5/1995 | Parker et al. | 600/454 |
| 5,445,156 | 8/1995 | Daft et al. | 600/454 |
| 5,462,058 | 10/1995 | Yamada et al. | 600/454 |

OTHER PUBLICATIONS

D'Alessio, "'Objective' algorithm for maximum frequency estimation in Doppler spectral analysers," Med & Biol. Engng. & Comput., vol. 23, pp. 63–68 (1985).

Mo et al., "'Speckle' in continuous wave Doppler ultrasound spectra: A simulation study," IEEE Trans. Ultrason., Ferroelec. & Freq. Control, vol. UFFC–33, No. 6, pp. 747–753 (Nov. 1986).

Rickey et al., "Evaluation of an automated real–time spectral analysis technique," Ultrasound Med. & Biol., vol. 22, No. 1, pp. 61–73 (1996).

Vaitkus et al., "Development of methods to analyse transcranial Doppler ultrasound signals recorded in microgravity," Med. & Biol. Engng. & Comput., vol. 28, pp. 306–311 (1990).

Mo et al., "Comparison of four digital maximum frequency estimators for Doppler ultrasound," Ultrasound Med. Biol., vol. 14, No. 5, pp. 355–363 (1988).

*Primary Examiner*—Marvin M. Lateef
*Assistant Examiner*—Maulin Patel
*Attorney, Agent, or Firm*—Dennis M. Flaherty; Christian G. Cabou; Phyllis Y. Price

[57] ABSTRACT

An analytical method for automatic tracing of a Doppler time-velocity waveform envelope. At the core of this algorithm is a maximum frequency detection mechanism which is based on searching for the highest frequency bin whose spectral amplitude exceeds a certain noise threshold. The method is based on a theoretical noise amplitude distribution in the video spectral domain. In particular, the method uses a precise model of the statistical distribution of the video spectral power of white noise to establish a threshold for maximum frequency detection. Input to the noise model is the average white noise level in the video spectral display, which can be computed using either of two analytical methods.

20 Claims, 7 Drawing Sheets

METHOD AND APPARATUS FOR AUTOMATIC TRACING OF DOPPLER TIME-VELOCITY WAVEFORM ENVELOPE

FIELD OF THE INVENTION

This invention relates to ultrasonic diagnostic systems which measure the velocity of blood flow using spectral Doppler techniques. In particular, the invention relates to the continuous display of such information, including maximum and mean blood flow velocities.

BACKGROUND OF THE INVENTION

Ultrasonic scanners for detecting blood flow based on the Doppler effect are well known. Such systems operate by actuating an ultrasonic transducer array to transmit ultrasonic waves into the object and receiving ultrasonic echoes backscattered from the object. In the measurement of blood flow characteristics, returning ultrasonic waves are compared to a frequency reference to determine the frequency shift imparted to the returning waves by flowing scatterers such as blood cells. This frequency shift translates into the velocity of the blood flow.

In state-of-the-art ultrasonic scanners, the pulsed or continuous wave (CW) Doppler waveform is computed and displayed in real-time as a grey-scale spectrogram of velocity versus time with the grey-scale intensity (or color) modulated by the spectral power. The data for each spectral line comprises a multiplicity of frequency data bins for different frequency intervals, the spectral power data in each bin for a respective spectral line being displayed in a respective pixel of a respective column of pixels on the display monitor. Each spectral line represents an instantaneous measurement of blood flow.

Many of the standard diagnostic Doppler indices are based on the maximum and mean frequency estimates at a given phase in the cardiac cycle such as peak systole or end diastole. Compared to the mean frequency, the maximum frequency estimate is relatively immune to background noise and wall filter effects. However, due to the specular nature of the Doppler spectrum, manual tracing of the maximum frequency waveform is generally time-consuming and is often subject to considerable intra- and inter-observer variations. Hence, an automated Doppler waveform tracing method that is robust over a wide range of SNR conditions would be a valuable productivity tool.

FIG. 1 is a block diagram of the basic signal processing chain in the conventional spectral Doppler mode. An ultrasound transducer array 2 is activated to transmit by a transmit ultrasound burst which is fired repeatedly at a pulse repetition frequency (PRF). The PRF is typically in the kilohertz range. The return RF signals are detected by the transducer elements and then formed into a receive beam by a beamformer 4. For a digital system, the summed RF signal from each firing is demodulated by demodulator 6 into its in-phase and quadrature (I/Q) components. The I/Q components are integrated (summed) over a specific time interval and then sampled by block 8. The summing interval and transmit burst length together define the length of the sample volume as specified by the user. The "sum and dump" operation effectively yields the Doppler signal backscattered from the sample volume. The Doppler signal is passed through a wall filter 10 which rejects any clutter in the signal corresponding to stationary or very slow moving tissue. The filtered output is then fed into a spectrum analyzer 12, which typically takes Fast Fourier Transforms (FFTs) over a moving time window of 64 to 128 samples. Each FFT power spectrum is compressed (block 14) and mapped (block 16) to a grey scale for display on monitor 18 as a single spectral line at a particular time point in the Doppler velocity (frequency) versus time spectrogram.

The automatic Doppler waveform tracing (block 20) is performed after the FFT power spectrum x is compressed in accordance with a compression function $h(x)=y$ and converted to grey map values in accordance with a mapping $g(y)=z$. The computed maximum/mean velocity traces are usually presented as overlay information on the spectrogram display. Whereas the mean frequency or velocity is defined by the first moment of the Doppler spectrum, the maximum frequency can be challenging to detect in a consistent manner, especially under weak SNR conditions.

In an article entitled "Objective algorithm for maximum frequency estimation in Doppler spectral analysers", Med. Biol. Engng. and Comput., Vol. 23, pp. 63–68 (1985), D'Alessio proposed a method of estimating a maximum frequency waveform based on a threshold-crossing technique that takes into account the exponential statistics of the FFT power spectrum of white noise prior to any compression or nonlinear mapping. A modified threshold method and other new methods have also been proposed (see, e.g., Mo et al., "Comparison of four digital maximum frequency estimators for Doppler ultrasound," Ultrasound in Med. & Biol., Vol. 14, pp. 355–363 (1988) and Vaitkus et al., "Development of methods to analyse transcranial Doppler ultrasound signals recorded in microgravity", Med. Biol. Engng. and Comput., Vol. 28, pp. 306–311 (1990)), but they are still based on the power spectrum before compression. For realization on a real-time clinical scanner, it is important to trace the mean/maximum frequencies of the compressed spectrum as expressed in grey scale units exactly as they are displayed on the monitor. Unfortunately, the compression (e.g. log) can substantially alter the statistical distribution of the noise spectral power such that the aforementioned methods are no longer applicable.

An automated method based on the video spectral data was disclosed in U.S. Pat. No. 5,287,753 to Routh et al. The method consists of finding the highest frequency with an intensity equal to a threshold value T, defined as a constant k times an average signal intensity divided by an average noise intensity. The threshold T is updated once every cardiac cycle in order to follow the signal level changes due to changes in instrument setting or movement of the transducer. However, this method is somewhat empirical for the following reasons. In defining the threshold T, each frequency bin is classified as either signal or noise depending on whether its power is above or below the previous threshold value. Of course, in reality each bin consists of some signal and some noise, and the two are not additive in the video spectral domain. Further, while the constant k may be appropriate over a narrow range of gain settings, it is unlikely that a constant multiplier can produce a suitable threshold level for maximum frequency detection over the entire range of gain setting, e.g., from 0 to 50 dB. In an article entitled "Evaluation of an automated real-time spectral analysis technique", Ultrasound in Med. & Biol., Vol. 22, pp. 61–73 (1996), Rickey et al. reported that the performance of this maximum frequency tracing method is quite good for Doppler signals obtained from a calibrated flow phantom, but it appears that their evaluations were based on very good SNR conditions (noise background was quite dark) that may not always be the case in clinical practice.

Thus there is a need for an objective method of tracing the maximum frequency waveform. In particular, it is desirable that the threshold for maximum frequency detection be computed using an analytical method. This analytical approach should be more robust than conventional semi-empirical methods, especially under adverse SNR conditions.

SUMMARY OF THE INVENTION

The present invention is an analytical method for automatic tracing of a Doppler time-velocity waveform envelope. At the core of this algorithm is a maximum frequency detection mechanism which is based on searching for the highest frequency bin whose spectral amplitude exceeds a certain noise threshold. Unlike the existing methods which require use of one or more empirical constants in setting the threshold level, the method of the invention is based on a theoretical noise amplitude distribution in the video spectral domain.

In particular, the method of the invention uses a precise model of the statistical distribution of the video spectral power of white noise to establish a threshold for maximum frequency detection. Input to the noise model is the average white noise level in the video spectral display, which can be computed using either of two analytical methods. The predicted threshold versus mean noise level is a highly nonlinear curve, which is key to achieving a robust performance over different display dynamic range settings and SNR conditions.

DETAILED DESCRIPTION OF THE PREFERRED EMBODIMENTS

The method in accordance with the present invention uses a precise model of the statistical distribution of the video spectral power of white noise to establish a threshold for maximum frequency detection. Input to the noise model is the average white noise level in the video spectral display, which can be computed using either of two analytical methods. It is appropriate to begin by deriving the theoretical noise distributions corresponding to x, y and z shown in FIG. 1.

It is well established (see Mo et al., "'Speckle' in continuous wave Doppler ultrasound spectra: a simulation study," IEEE Trans. Ultrason., Ferroelec. & Freq. Control, UFFC-33, pp. 747–753 (1986)) that the spectral power of any zero-mean Gaussian signal (including white noise) is governed by the exponential probability density distribution:

$$f_x(x) = \frac{1}{m} e^{-x/m}, x \geq 0 \qquad (1)$$

where the mean and standard deviation of x are given by:

$$E[x]=m; \sigma=m \qquad (2)$$

Figure 2:
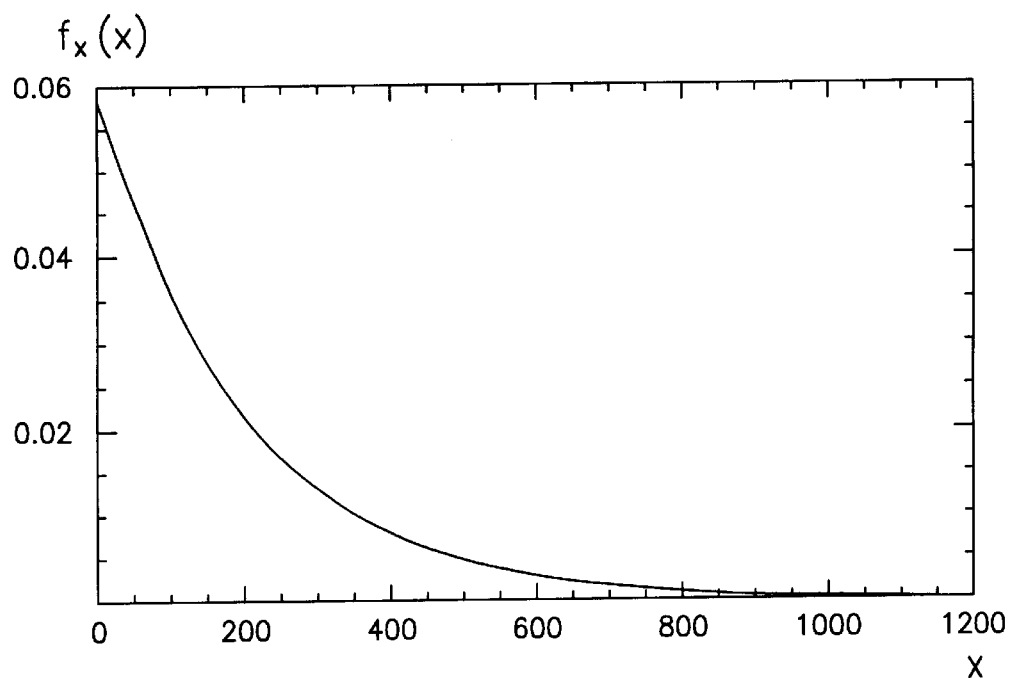
FIG. 2 is a graph showing the exponential probability density distribution $f_x(x)$ for m=200.

For a digital Doppler system, x is typically a 12 to 16-bit integer. A plot of $f_x(x)$ versus x for m=200 is shown in FIG. 2.

Figure 1:
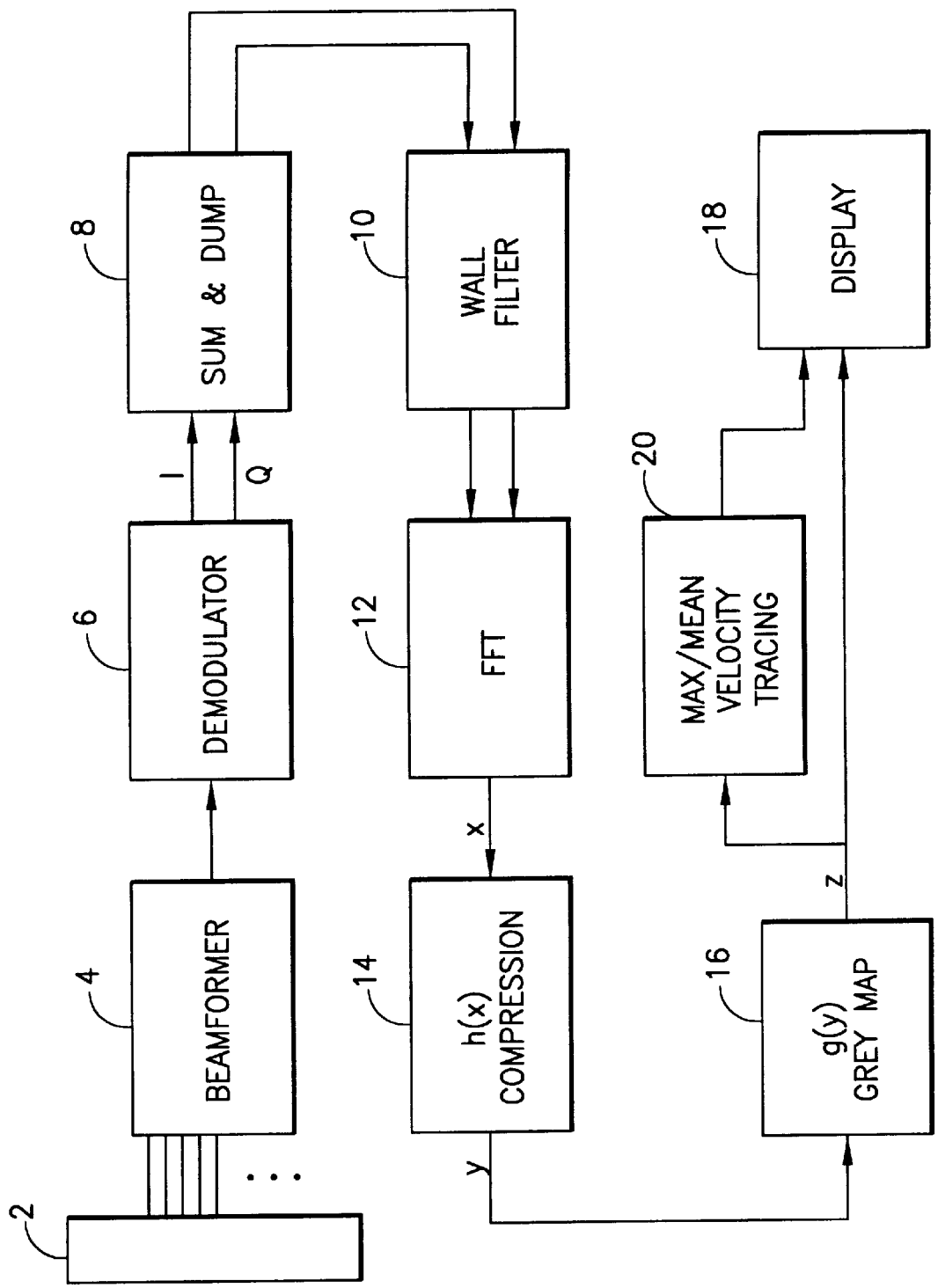
FIG. 1 is a block diagram showing the signal processing chain for a conventional spectral Doppler mode with automatic maximum and/or mean velocity waveform tracing. I and Q denote the in-phase and quadrature components of the demodulated signal.

Referring to FIG. 1, suppose the compressed and video display intensity spectral output are respectively given by:

$$y=h(x) \qquad (3)$$

and $$z=g(y)=g(h(x)) \qquad (4)$$

According to standard statistics, the probability density distribution of z is given by:

$$f_z(z)dz = \frac{f_x(x)}{|dz/dx|} dz \qquad (5)$$

As an example, suppose the compression function is defined by a log operation as follows:

$$y=10 log[x+1] \qquad (6)$$

Figure 3:
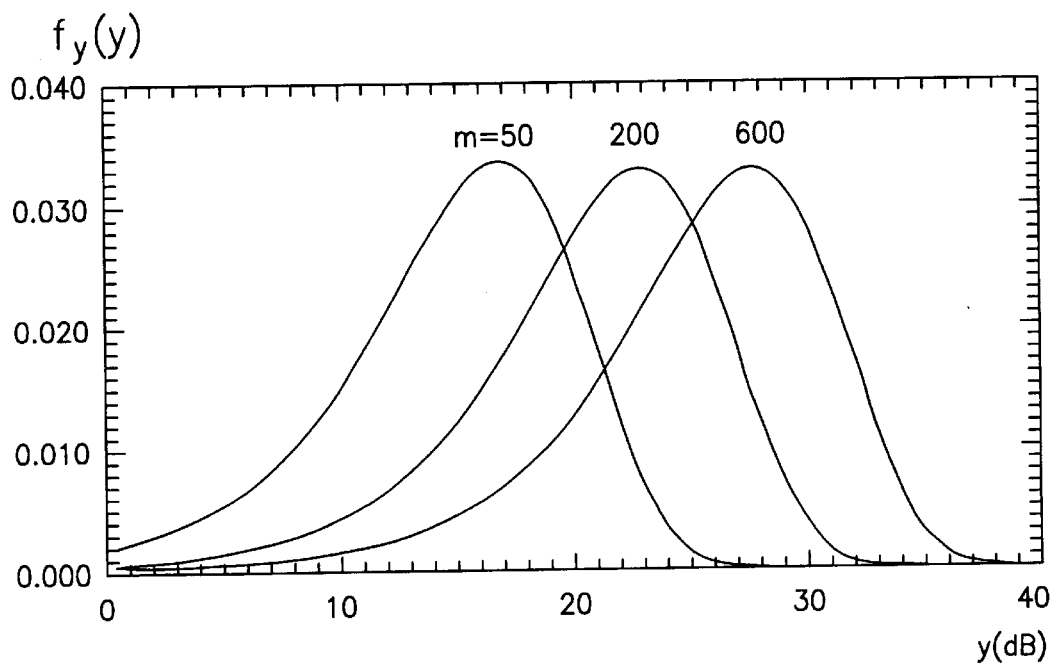
FIG. 3 is a graph showing the probability density distribution $f_y(y)$ of the log-compressed noise spectral power y. Note that an increased gain basically shifts m to the right without significantly affecting the width of the probability density distribution.

Using a similar transformation as given in Eq. (5), the probability density distribution of y can be shown to be $$f_y(y) = \frac{a}{m} \exp(ay) \exp\left(-\frac{1}{m}[\exp(ay)-1]\right) \qquad (7)$$

in which a=0.1 ln(10). Since m=E[x], it will increase with signal gain. FIG. 3 shows a plot of Eq. (7) for m=50, 200 and 600. Note that an increased gain basically shifts m to the right without significantly affecting the width of the probability density distribution.

Figure 4:
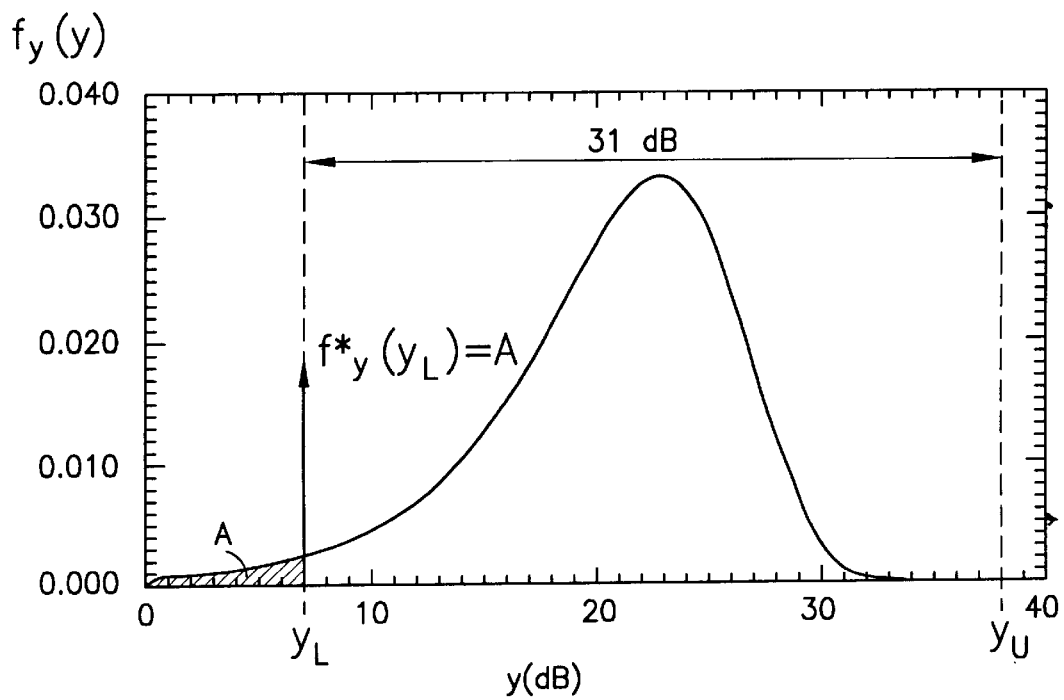
FIG. 4 is a graph showing the probability density distribution $f_y(y)$ of the log-compressed noise spectral power y for m=200, but over a limited dynamic range of 31 dB.

In practice, the log compression curve is often pivoted at some intermediate y value in an attempt to maintain a constant mean intensity level for the different dynamic range settings. This means that for very small or large gain settings, the probability density distribution may saturate at the low or high end of the dynamic range (typically 20–40 dB). FIG. 4 shows a plot of the probability density distribution for a dynamic range whose lower and upper limits are about $y_L$=7 dB and $y_U$=38 dB respectively. Notice that all the samples in the hatched area A will take on the minimum value of $y=y_L$ for this 31 dB dynamic range setting.

Figure 5:
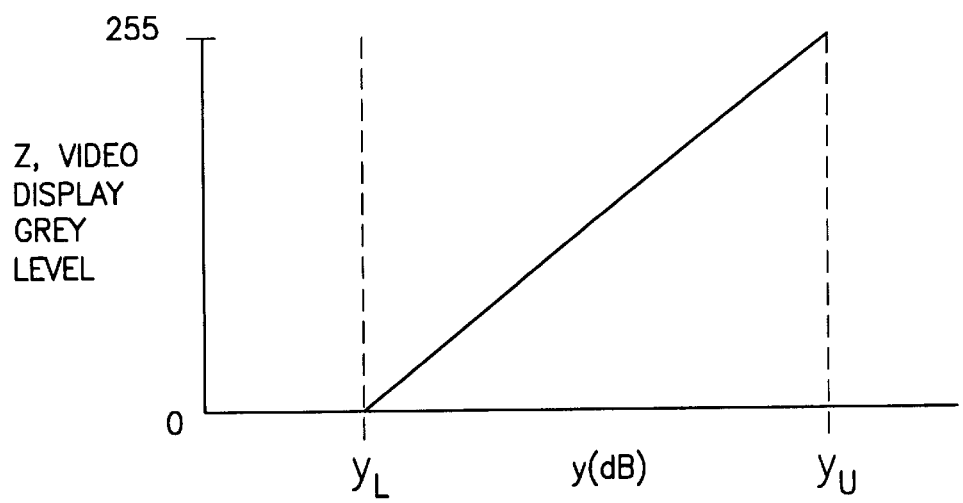
FIG. 5 is a graph showing the mapping of y to z using a linear grey map.

The grey mapping prior to the final video display typically consists of 6 to 8 bits or N=64 to 256 grey levels. To complete the example, suppose an 8-bit linear grey map is used to display the chosen dynamic range. This means that, as shown in FIG. 5, $y_L$ maps to z=0 and $y_U$ maps to z=255, i.e., $$z = \frac{255}{y_U - y_L}(y - y_L) \qquad (8)$$

Since this is a linear relationship, the probability density distribution of z will have the same form as that for y. In general, if the grey map is nonlinear, Eq. (5) should be used to determine $f_z(z)$.

Figure 6:
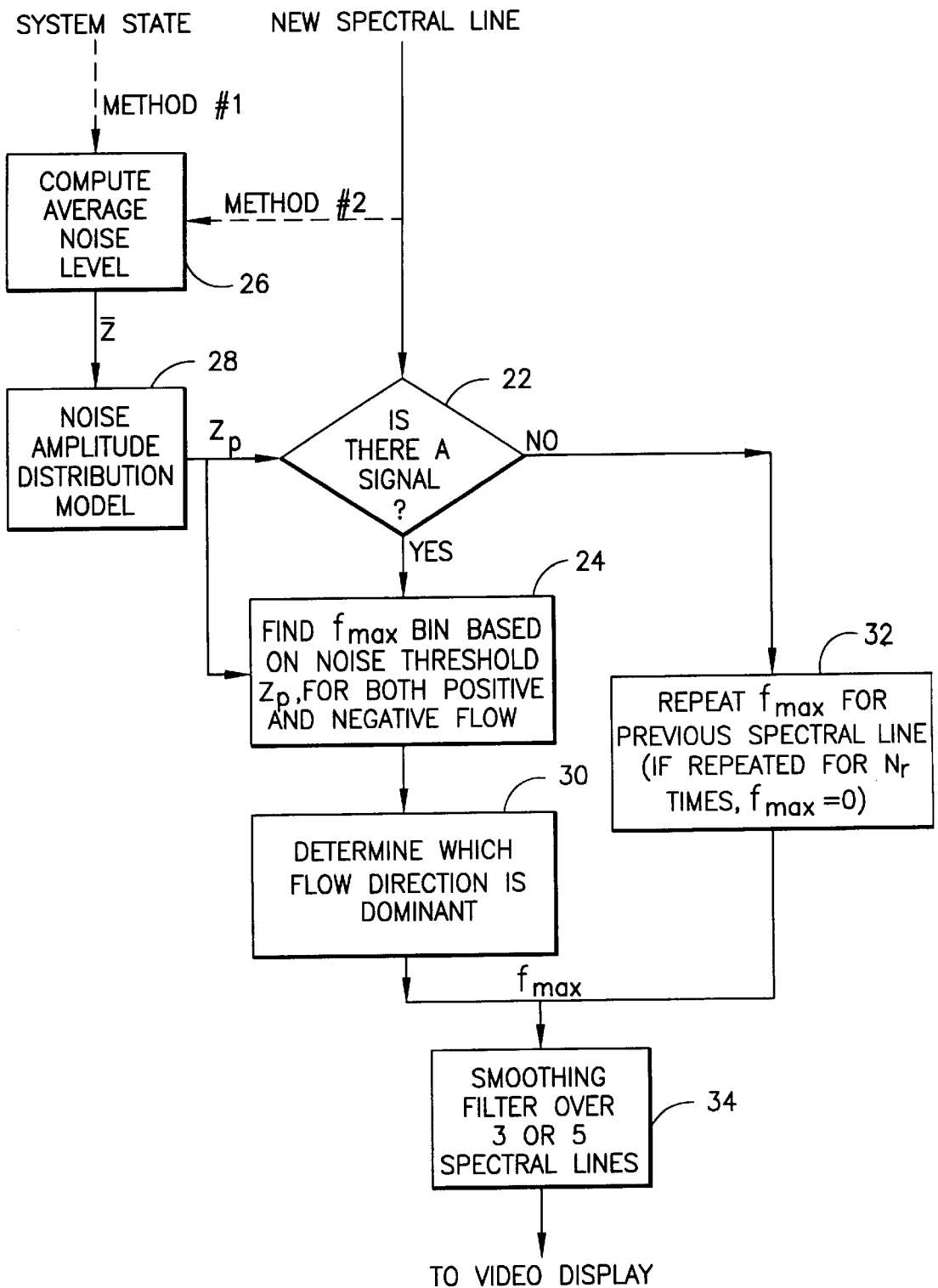
FIG. 6 is a flowchart showing the main steps of the maximum frequency detection algorithm in accordance with the present invention.

The main steps in the maximum frequency detection algorithm of the present invention are shown in FIG. 6. The first step 22 is to determine if a signal is present at all. If the signal presence test is positive, the next step 24 is to detect the maximum frequency of the signal spectrum based on finding the highest frequency bin that exceeds a certain noise threshold level $z_p$ as determined in steps 26 and 28. In step 30, a determination is made which flow direction is dominant. If the signal presence test is negative, then the maximum frequency estimate for the previous spectral line is repeated for up to $N_r$ times (step 32) before the maximum frequency estimate is set to zero. For example, $N_r$=5 is a reasonable value. Finally, the maximum frequency estimates over 3 to 5 successive time points are smoothed (step 34) using a filter to reduce the jitter and any outlier in the maximum frequency tracing.

The method of the invention is objective in that both the signal presence test and maximum frequency detection are based on the use of a noise threshold $z_p$, which corresponds to the (1−p)-th percentile point of the theoretical noise distribution in the video spectral domain. In most situations, the condition p<0.1% must be satisfied to avoid picking up extraneous noise spikes. The method in accordance with the invention further recognizes that for each new spectral line, $z_p$ can be determined analytically from the mean noise level $\bar{z}$, which can be estimated using either of two methods (dashed lines in FIG. 6). In the following, each of the main steps shown in FIG. 6 is described in detail.

In accordance with the method of the invention, the mean noise level $\bar{z}$ is determined. If $f_z(z)$ is the video noise distribution as defined by Eq. (5), then the mean video noise level is $$E(z) = \frac{\sum_{0}^{N-1} i f_z(i)}{\sum_{0}^{N-1} f_z(i)} \qquad (9)$$

Figure 7A:
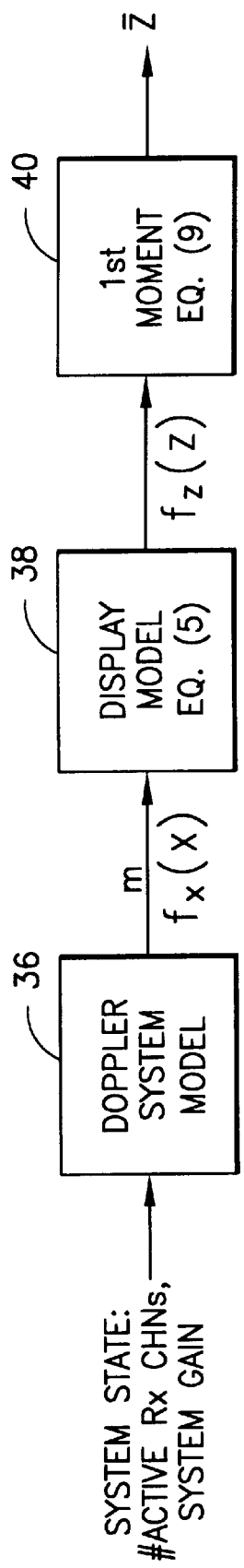
FIGS. 7A and 7B are flowcharts showing two methods for obtaining a reliable estimate of the mean video noise level z.
Figure 7B:
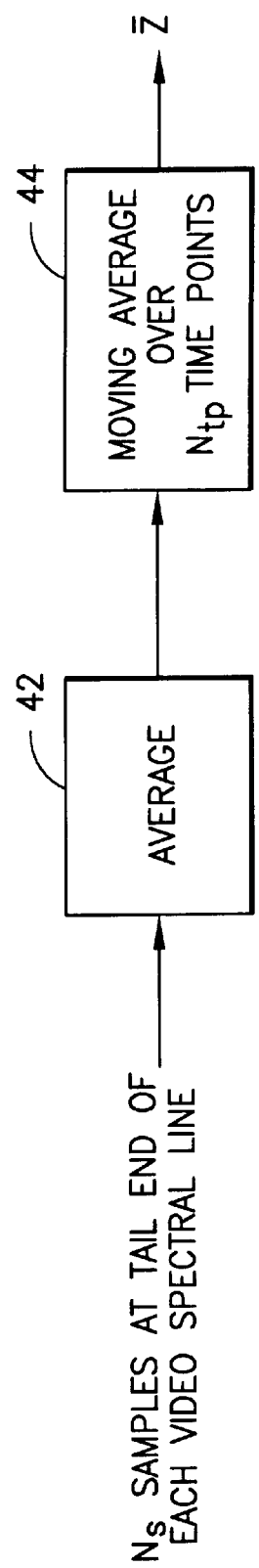

The two methods of estimating $\bar{z}=E(z)$ (as indicated by the dashed lines in FIG. 6) are detailed in FIGS. 7A and 7B respectively. The first method assumes that the system noise originates primarily from the pre-amp in each receive channel in the beamformer, which is probably true for many conventional all-digital systems. The pre-amp Johnson noise is often specified as a rms voltage per $Hz^{1/2}$ (e.g., 10 nV/$Hz^{1/2}$) at room temperature. Thus, knowing the equivalent noise bandwidth of all the filters in the Doppler signal path (demodulator to sum & dump filter in FIG. 1) should enable an absolute rms noise level to be computed as a function of system gain. Any quantization noise due to analog-to-digital conversion can also be added in an appropriate manner. Further, knowing the sample volume position and aperture strategy in the Doppler mode, it should be straightforward to compute the total system noise by summing over all active receive channels (including array apodization effects) for a given sample volume position. Dividing this total noise level by the number of FFT points would yield the mean spectral noise power m, which completely specifies the exponential noise distribution $f_x(x)$ of Eq. (1). The $f_x(x)$ can be transformed into $f_z(z)$ via Eq. (5) to account for the postprocessing associated with a grey-scale display. Equation (9) can then be used to evaluate z for that particular system state.

For the special case of a linear grey map, such as the 8-bit map defined by Eq. (8), $\bar{z}$ can be obtained directly from $$E(z) = \frac{255}{y_U - y_L}(E(y) - y_L) \qquad (10)$$

where E(y) is the first moment (similar to Eq. (9)) of $f_y(y)$ over the range [$y_L$, $y_U$], such that any saturation effect at either end of the dynamic range is accounted for by redefining $f_y(y)$ at the end points as follows:

$$f_y^*(y_L) = \int_0^{y_L} f_y(\zeta)d\zeta, \quad f_y^*(y_U) = \int_{y_U}^{\infty} f_y(\zeta)d\zeta \qquad (11)$$

Figure 8:
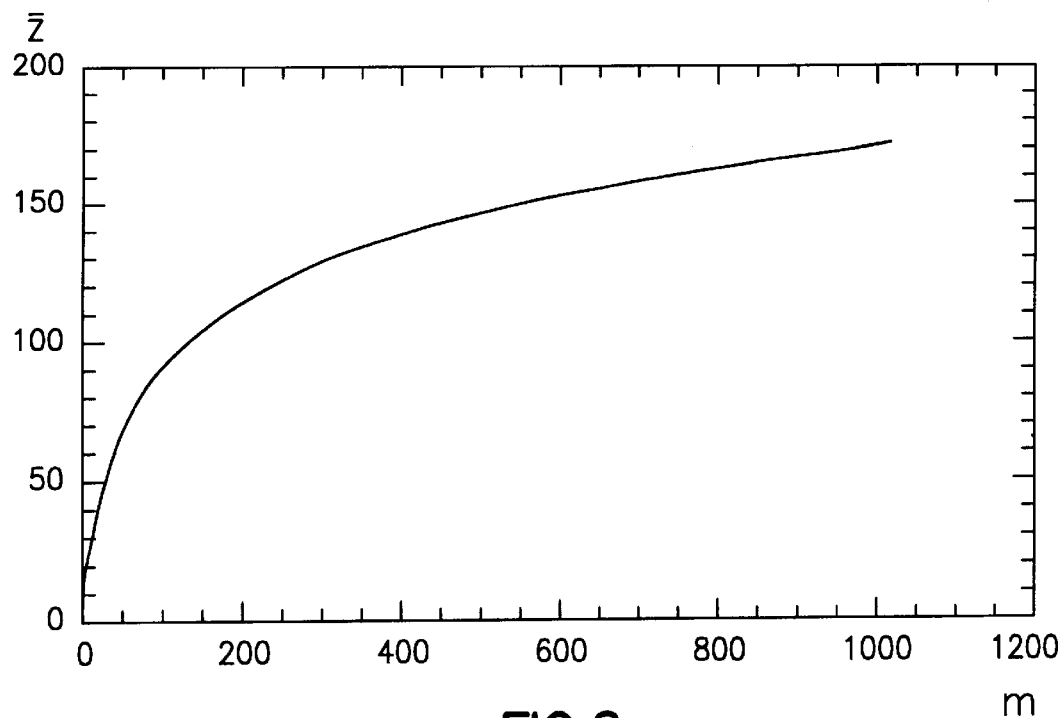
FIG. 8 is a graph showing the mean video noise level z versus m for a 31 dB dynamic range as specified in FIG. 4.

For the example shown in FIG. 4, the first integral of Eq. (11) corresponds to the hatched area A which is mapped to a delta function of amplitude $f_y^*(y_L)$. Using this approach, the E(y) has been computed over a wide range of m, and the corresponding $\bar{z}$ based on Eq. (10) is plotted in FIG. 8. Note that m can be further expressed in terms of the system state through the Doppler system model of FIG. 7A.

The second method of estimating $\bar{z}$ does not require knowledge of the system gain and the origin of system noise. Instead, as shown in FIG. 7B, it consists of averaging the spectral magnitude of the last $N_S$ frequency bins (assumed to contain only pure noise) on the positive or negative (or both) frequency axis, and then averaging the result over $N_{tp}$ time points. Reasonable averaging lengths are $N_S$=2 and $N_{tp}$=32. The $\bar{z}$ estimate can be updated continuously or once every second or so.

Compared to the first method of FIG. 7A, the second method of FIG. 7B does not assume that front-end pre-amp noise is the only source of noise, but it does assume that the last $N_S$ bins in each spectral line contain only pure noise. Although the latter condition may not be true when the velocity scale is too small (aliased spectrum), it is not unreasonable because the trace values are used to calculate diagnostic indices which are not valid for aliased flow.

The noise threshold $z_p$ is then determined from $\bar{z}$. For an N-level grey scale (z ranges from 0 to N−1), the noise threshold $z_p$, which is greater than (1−p) of the noise distribution, is defined by $$\sum_{0}^{z_p} f_z(z) = (1 - p)\sum_{0}^{N-1} f_z(z) \qquad (12)$$

Figure 9:
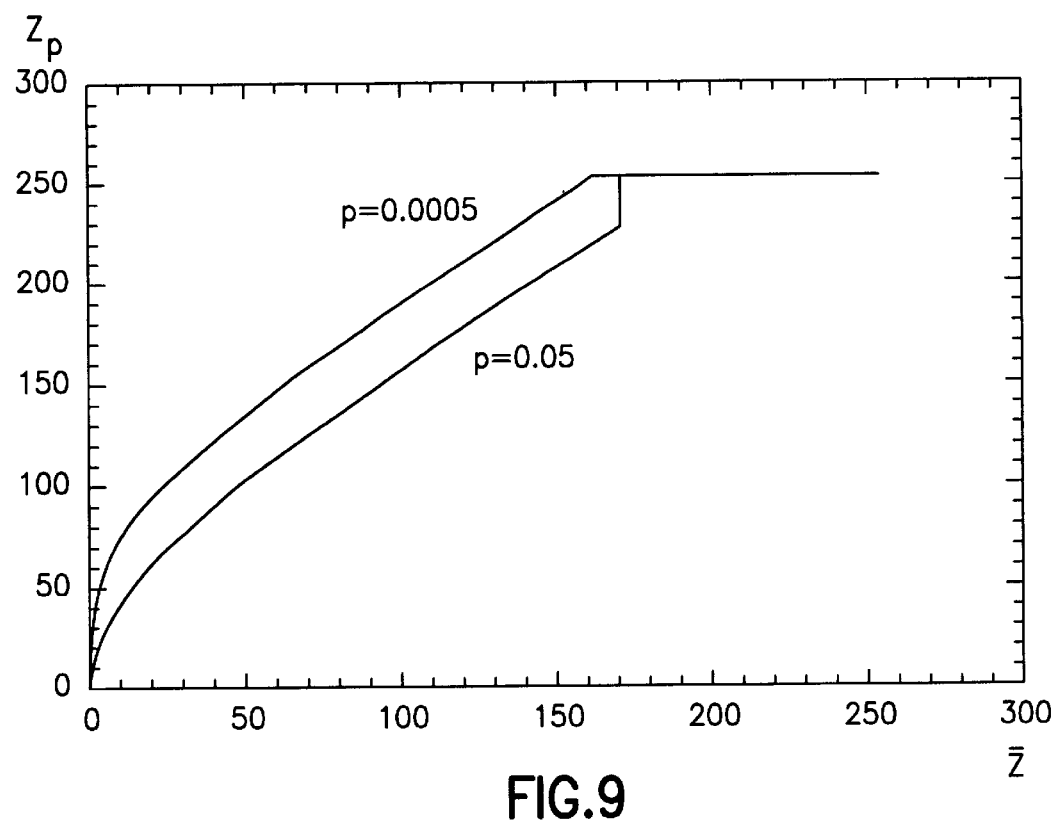
FIG. 9 is a graph showing the noise threshold versus mean noise level for the dynamic range shown in FIG. 4.

Thus, $z_p$ can be determined from $f_z(z)$, whose mean is z. FIG. 9 shows a plot of $z_p$ versus z, for the same 31 dB dynamic range setting as for FIG. 8. For each z (or gain setting), the noise threshold was evaluated based on Eq. (12) for p=0.05 and p=0.0005. It has been found that p values larger than 0.05 can lead to detection of too many spurious noise peaks, whereas p values much smaller than 0.0005 can lead to excessive underestimation of the true $f_{max}$ waveform. The two threshold curves in FIG. 9 are very much in parallel except at the low end where saturation effects are present. In practice, the signal amplitudes often occupy the region in which the curves are linear, and the noise average z often lies in the lower region where the curves are highly nonlinear. For this reason, any empirical threshold-crossing method based on a constant factor times some measure of noise level will only work well over a narrow range of gain settings.

For software implementation of the nonlinear threshold curve, since the number N of grey levels is usually no larger than 256 (8 bits), it is preferred to pre-calculate and store the optimal curves for the different dynamic range settings in an array or look-up table. In this case no real-time computation is needed for determining the key noise threshold value.

Having determined the noise threshold level $z_p$ for the current z in step 28 (see FIG. 6), the signal presence test (step 22) consists of finding the maximum spectral magnitude $z_{max}$ over all frequencies, and checking if the following condition is true:

$$z_{max} \geq z_p + \Delta \tag{13}$$

where $\Delta$ is the minimum required height of the magnitude peak of a signal spectrum relative to the noise threshold. In general, $\Delta$ is a function of the dynamic range setting and grey map resolution. For an 8-bit grey map, the value of $\Delta$ may range from 25 to 50. Note that this signal presence test is stronger than just testing if any one bin has exceeded $z_p$, which can be triggered by an extraneous noise peak that happens to lie in the extreme top p % of the noise distribution. To those skilled in the art, it would also be apparent that there exists many minor variations to this signal presence test, including checking if the total area under the spectrum from zero to the frequency corresponding to $z_{max}$, is greater than some signal energy threshold.

Figure 10:
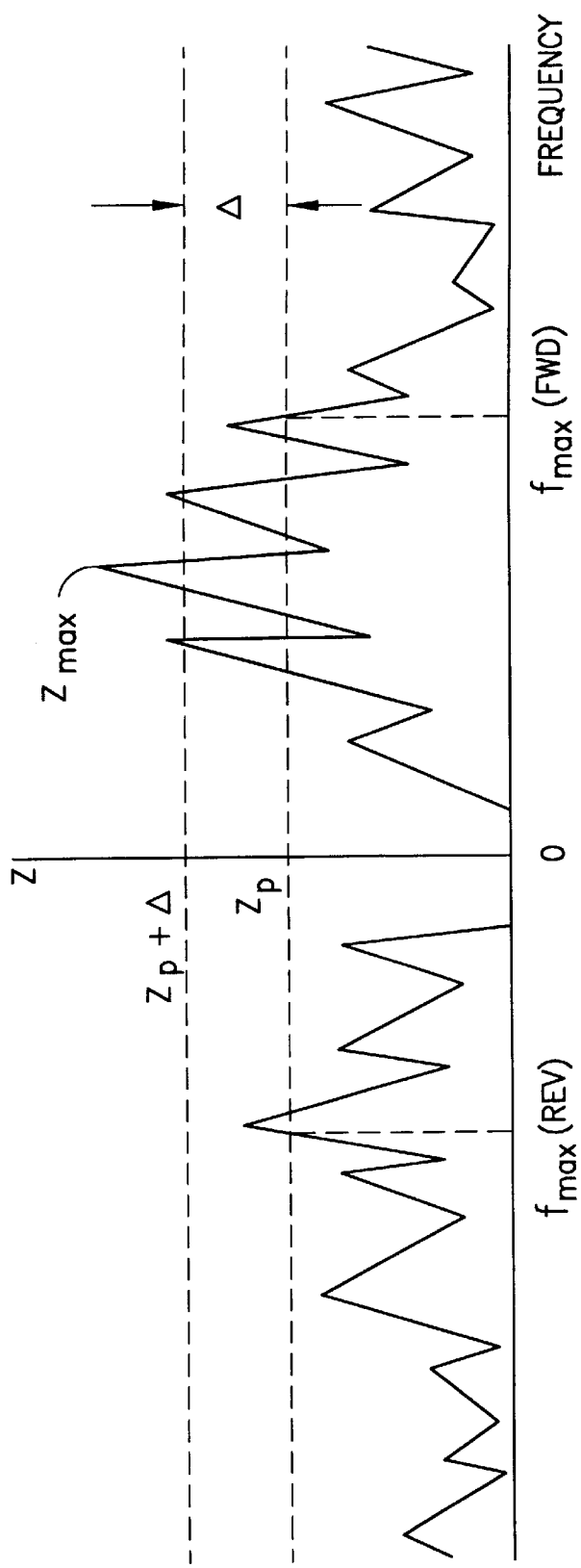
FIG. 10 is a graph showing $z_{max}$ and $f_{max}$ in a single video grey-level spectrum.

In accordance with the preferred algorithm, the maximum velocity is then detected based on a first threshold-crossing (step 24 in FIG. 6). Referring to FIG. 10, if the signal presence test of Eq. (13) is positive, then the algorithm proceeds to find $f_{max}$(fwd) and $f_{max}$(rev) for the forward and reverse flow spectra respectively. This is achieved by starting from the most positive and most negative frequency bins, and moving towards the baseline to find the first frequency bin with amplitude greater than $z_p$ on each side of the baseline. Since $z_{max}$ is greater than $z_p$, the existence of $f_{max}$ on at least one side of the baseline is guaranteed.

Obvious variations of this threshold-crossing technique might include checking for two or more consecutive bins that have crossed the noise threshold.

Figure 11:
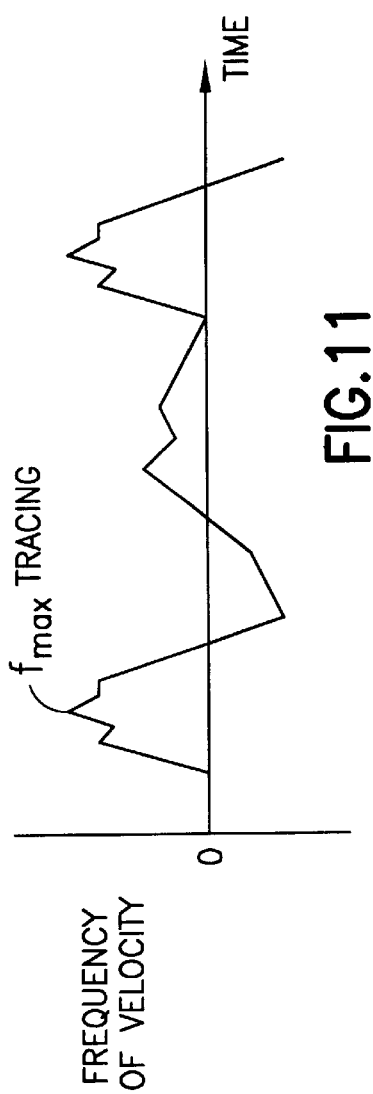
FIG. 11 is a graph showing a tri-phasic maximum flow velocity waveform.

The next step is to determine the flow direction of the dominant signal spectrum (step 30 in FIG. 6). As shown in FIG. 11, in many arterial flow situations, the waveform may exhibit a "triphasic" behavior such that flow in both directions may occur in different phases of a cardiac cycle. For this reason, it is important for the maximum frequency tracing algorithm to be able to follow the change of flow direction in different cardiac phases. For the present spectral line, if $f_{max}$ is detected on only one side of the baseline, then no decision is necessary. If $f_{max}$ is detected on both sides (as in the example of FIG. 10), the integrated sum of spectral amplitudes from zero frequency to $f_{max}$(fwd) is compared to that from zero frequency to $f_{max}$(rev). The $f_{max}$ corresponding to the side with the greater total energy or area is used in the tracing.

In some applications, it is possible that a forward arterial flow waveform and a reverse venous flow waveform are present simultaneously. An option may be provided to the user to trace only the forward flow spectrum or only the reverse flow spectrum, rather than following the dominant side as in the above biphasic option.

Finally, the maximum velocity envelope tracing is smoothed. For a non-zero p value, occasionally a spurious noise peak in the extreme top end of the noise distribution will still be detected. Even if no spurious noise peak is picked up, it is often desirable to smooth the $f_{max}$ tracing over 3 to 5 adjacent time points. A median filter is recommended because it can remove outliers without significantly affecting the good $f_{max}$ estimates. Other choices include a linear box-car averager.

The foregoing preferred embodiments have been disclosed for the purpose of illustration. Variations and modifications will be readily apparent to those skilled in the art. All such variations and modifications are intended to be encompassed by the claims set forth hereinafter.

We claim:

1. A method for automatic tracing of a Doppler velocity-time waveform envelope on a display monitor, comprising the steps of:

transmitting pulses of ultrasound into a sample volume of ultrasound scatterers;

acquiring a multiplicity of successive samples of Doppler signals backscattered from said sample volume of ultrasound scatterers;

processing said Doppler signals to produce spectral line data representing velocity for continuous display of a succession of spectral lines during the continuation of Doppler signal acquisition, the data for each spectral line comprising a multiplicity of frequency bins for different frequency intervals, each bin containing spectral power data for a respective frequency interval, the spectral power data in each bin for each spectral line being displayed as a grey scale in a respective pixel of a corresponding column of pixels on the display monitor;

for each spectral line, estimating a respective mean spectral noise power, determining a respective spectral noise threshold calculated as a function of said respective estimated mean spectral noise level, and estimating a highest frequency for those frequency bins having a spectral power which exceeds said respective spectral noise threshold; and tracing an envelope through the pixels corresponding to said frequency bins of highest frequency having a spectral power exceeding said respective spectral noise thresholds.

2. The method as defined in claim 1, further comprising the step of filtering the estimated highest frequency over a plurality of successive time points.

3. The method as defined in claim 1, wherein said step of estimating the highest frequency is performed for both positive and negative flow.

4. The method as defined in claim 3, further comprising the step of determining the flow direction having a dominant signal spectrum if a highest frequency is estimated for both positive and negative flow.

5. The method as defined in claim 4, wherein said step of determining the flow direction having a dominant signal spectrum comprises the steps of comparing the integrated sum of spectral amplitudes from zero frequency to said estimated highest frequency for positive flow and the integrated sum of spectral amplitudes from zero frequency to said estimated highest frequency for negative flow, and then using in the tracing the estimated highest frequency for the flow having the largest integrated sum.

6. The method as defined in claim 1, wherein said step of estimating a respective mean spectral noise level comprises the steps of:

computing a total system noise for a given sample volume position;

dividing said total system noise by the number of Fast Fourier Transform points to yield a mean spectral noise power m;

determining an exponential noise distribution $f_x(x)$ as a function of m in accordance with the equation:

$$f_x(x) = \frac{1}{m} e^{-x/m}, x \geq 0$$

transforming $f_x(x)$ into $f_z(z)$ in accordance with the equation:

$$f_z(z)dz = \frac{f_x(x)}{|dz/dx|}dz$$

and determining a mean video spectral noise level in accordance with the equation:

$$E(z) = \frac{\sum_{0}^{N-1} i f_z(i)}{\sum_{0}^{N-1} f_z(i)}.$$

7. The method as defined in claim 6, wherein for the case of a linear grey mapping, the mean video spectral noise level is determined in accordance with the equation:

$$E(z) = \frac{255}{y_U - y_L}(E(y) - y_L).$$

8. The method as defined in claim 1, wherein said step of estimating a respective mean spectral noise level comprises the steps of:

averaging the spectral amplitude of the last $N_S$ frequency bins for at least one of the positive and negative flow; and averaging the averaged spectral amplitude over $N_{tp}$ time points, wherein $N_S$ and $N_{tp}$ are integers.

9. The method as defined in claim 1 wherein said respective spectral noise threshold is determined in accordance with the equation:

$$\sum_{0}^{z_p} f_z(z) = (1-p) \sum_{0}^{N-1} f_z(z).$$

10. The method as defined in claim 9, wherein curves of the spectral noise threshold versus the mean spectral noise level as a function of dynamic range are pre-calculated and stored in a look-up memory.

11. A system for automatic tracing of a Doppler velocity-time waveform envelope on a display monitor, comprising:

means for transmitting pulses of ultrasound into a sample volume of ultrasound scatterers;

means for acquiring a multiplicity of successive samples of Doppler signals backscattered from said sample volume of ultrasound scatterers;

a display monitor comprising columns of pixels;

means for processing said Doppler signals to produce spectral line data representing velocity for continuous display of a succession of spectral lines during the continuation of Doppler signal acquisition, the data for each spectral line comprising a multiplicity of frequency bins for different frequency intervals, each bin containing spectral power data for a respective frequency interval, the spectral power data in each bin for each spectral line being displayed as a grey scale in a respective pixel of a corresponding column of pixels on said display monitor;

means for estimating a respective mean spectral noise power for each spectral line;

means for determining a respective spectral noise threshold for each spectral line, calculated as a function of said respective estimated mean spectral noise level;

means for estimating for each spectral line a highest frequency for those frequency bins having a spectral power which exceeds said respective spectral noise threshold; and means for tracing an envelope through the pixels corresponding to said frequency bins of highest frequency having a spectral power exceeding said respective spectral noise thresholds.

12. The system as defined in claim 11, further comprising means for filtering the estimated highest frequency over a plurality of successive time points.

13. The system as defined in claim 11, wherein said means for estimating the highest frequency comprise means for estimating the highest frequency for both positive and negative flow.

14. The system as defined in claim 13, further comprising means for determining the flow direction having a dominant signal spectrum if a highest frequency is estimated for both positive and negative flow.

15. The system as defined in claim 14, wherein said means for determining the flow direction having a dominant signal spectrum comprise means for comparing the integrated sum of spectral amplitudes from zero frequency to said estimated highest frequency for positive flow and the integrated sum of spectral amplitudes from zero frequency to said estimated highest frequency for negative flow, and said means for tracing uses the estimated highest frequency for the flow having the largest integrated sum.

16. The system as defined in claim 11, wherein said means for estimating a respective mean spectral noise level comprise:

means for computing a total system noise for a given sample volume position;

means for dividing said total system noise by the number of Fast Fourier Transform points to yield a mean spectral noise power m;

means for determining an exponential noise distribution $f_x(x)$ as a function of m in accordance with the equation:

$$f_x(x) = \frac{1}{m} e^{-x/m}, x \geq 0$$

means for transforming $f_x(x)$ into $f_z(z)$ in accordance with the equation:

$$f_z(z)dz = \frac{f_x(x)}{|dz/dx|}dz$$

and means for determining a mean video spectral noise level in accordance with the equation:

$$E(z) = \frac{\sum_0^{N-1} i f_z(i)}{\sum_0^{N-1} f_z(i)}.$$

17. The system as defined in claim 16, wherein for the case of a linear grey mapping, the mean video spectral noise level is determined in accordance with the equation:

$$E(z) = \frac{255}{y_U - y_L}(E(y) - y_L).$$

18. The system as defined in claim 11, wherein said means for estimating a respective mean spectral noise level comprise:

means for averaging the spectral amplitude of the last $N_S$ frequency bins for at least one of the positive and negative flow; and means for averaging the averaged spectral amplitude over $N_{tp}$ time points, wherein $N_S$ and $N_{tp}$ are integers.

19. The system as defined in claim 11, wherein said respective spectral noise threshold is determined in accordance with the equation:

$$\sum_0^{z_p} f_z(z) = (1-p)\sum_0^{N-1} f_z(z).$$

20. The system as defined in claim 19, further comprising look-up memory means for storing curves of the spectral noise threshold versus the mean spectral noise level as a function of dynamic range.

* * * * *